(12) United States Patent
Peng

(10) Patent No.: US 10,599,329 B2
(45) Date of Patent: Mar. 24, 2020

(54) TERMINAL DEVICE AND LOCKING OR UNLOCKING METHOD FOR TERMINAL DEVICE

(71) Applicant: Huawei Device Co., Ltd., Dongguan (CN)

(72) Inventor: Hai Peng, Wuhan (CN)

(73) Assignee: Huawei Device Co., Ltd., Dongguan (CN)

( * ) Notice: Subject to any disclaimer, the term of this patent is extended or adjusted under 35 U.S.C. 154(b) by 978 days.

(21) Appl. No.: 14/961,280

(22) Filed: Dec. 7, 2015

(65) Prior Publication Data

US 2016/0085442 A1 Mar. 24, 2016

Related U.S. Application Data

(63) Continuation of application No. PCT/CN2014/082009, filed on Jul. 11, 2014.

(30) Foreign Application Priority Data

Jul. 12, 2013 (CN) .......................... 2013 1 0293589

(51) Int. Cl.
*G06F 3/0488* (2013.01)
*G06F 3/041* (2006.01)

(52) U.S. Cl.
CPC ........ *G06F 3/04886* (2013.01); *G06F 3/0412* (2013.01); *G06F 3/0488* (2013.01); *G06F 2203/04104* (2013.01); *G06F 2203/04808* (2013.01)

(58) Field of Classification Search
CPC .. G06F 3/04886; G06F 3/0412; G06F 3/0488; G06F 2203/04104; G06F 2203/04808
See application file for complete search history.

(56) References Cited

U.S. PATENT DOCUMENTS 4,742,327 A * 5/1988 Burgess .............. B60R 25/1001
307/10.2
5,996,894 A * 12/1999 Yin ..................... G03G 15/5016
235/454
8,311,530 B2 * 11/2012 Kornilovsky ......... G06F 3/0362
345/173
8,355,698 B2 * 1/2013 Teng ....................... H04M 1/67
455/411

(Continued)

FOREIGN PATENT DOCUMENTS

| CN | 101515959 A | 8/2009 |
| CN | 102419687 A | 4/2012 |

(Continued)

*Primary Examiner* — Jennifer N To
*Assistant Examiner* — Joseph R. Burwell
(74) *Attorney, Agent, or Firm* — Slater Matsil, LLP

(57) ABSTRACT

A terminal device and a locking or unlocking method for the terminal device are provided. The locking or unlocking method is used for locking or unlocking a virtual key area of a terminal device when a touch panel of the terminal device is in an unlocked state, and the method includes: receiving multiple reported virtual key press events; and determining that the received virtual key press events meet a preset locking or unlocking condition, and setting a state of the virtual key area of the terminal device to a locked state or the unlocked state.

16 Claims, 5 Drawing Sheets

(56) References Cited

U.S. PATENT DOCUMENTS

| | | | |
|---|---|---|---|
| 2003/0182558 A1* | 9/2003 | Lazzaro | G06Q 30/0641 713/183 |
| 2005/0085215 A1* | 4/2005 | Kokko | H04M 1/72541 455/404.1 |
| 2006/0097993 A1* | 5/2006 | Hietala | G06F 1/1626 345/173 |
| 2007/0089164 A1* | 4/2007 | Gao | G06F 3/04886 726/4 |
| 2008/0259038 A1* | 10/2008 | Hokkanen | G06F 3/023 345/169 |
| 2009/0243897 A1* | 10/2009 | Davidson | G06F 3/0233 341/22 |
| 2010/0017872 A1* | 1/2010 | Goertz | G06F 3/0481 726/16 |
| 2010/0115448 A1 | 5/2010 | Lysytskyy et al. | |
| 2010/0306718 A1* | 12/2010 | Shim | G06F 3/04883 715/863 |
| 2010/0325721 A1* | 12/2010 | Bandyopadhyay | G06F 21/316 726/19 |
| 2011/0041102 A1* | 2/2011 | Kim | G06F 3/04883 715/863 |
| 2012/0009896 A1* | 1/2012 | Bandyopadhyay | G06F 1/1643 455/411 |
| 2012/0069231 A1* | 3/2012 | Chao | G06F 3/04883 348/333.01 |
| 2012/0075212 A1 | 3/2012 | Park et al. | |
| 2012/0165961 A1* | 6/2012 | Folscheid | G06F 21/81 700/17 |
| 2012/0166696 A1* | 6/2012 | Kallio | H04M 1/67 710/260 |
| 2012/0169604 A1* | 7/2012 | Chen | G06F 3/0233 345/168 |
| 2013/0036461 A1* | 2/2013 | Lowry | G06F 21/36 726/19 |
| 2013/0113736 A1* | 5/2013 | Kornilovsky | G06F 3/0362 345/173 |
| 2013/0189952 A1* | 7/2013 | Kim | H04W 12/00 455/411 |
| 2013/0190056 A1* | 7/2013 | Chaudhri | G06F 3/04883 455/566 |
| 2013/0241837 A1 | 9/2013 | Oga | |
| 2013/0314336 A1* | 11/2013 | Ting | G06F 3/04886 345/173 |
| 2013/0326582 A1* | 12/2013 | Kruzeniski | G06F 21/6209 726/2 |
| 2013/0332885 A1* | 12/2013 | Ji | G06F 3/04847 715/833 |
| 2014/0164941 A1* | 6/2014 | Kim | G06F 21/36 715/741 |
| 2015/0077377 A1* | 3/2015 | Han | G06F 1/1694 345/173 |

FOREIGN PATENT DOCUMENTS

| | | |
|---|---|---|
| CN | 102937870 A | 2/2013 |
| CN | 103019596 A | 4/2013 |
| CN | 103116450 A | 5/2013 |
| CN | 103164039 A | 6/2013 |
| CN | 103399704 A | 11/2013 |
| WO | 2012070682 A1 | 5/2012 |

* cited by examiner

TERMINAL DEVICE AND LOCKING OR UNLOCKING METHOD FOR TERMINAL DEVICE

This application is a continuation of International Application No. PCT/CN2014/082009, filed on Jul. 11, 2014, which claims priority to Chinese Patent Application No. 201310293589.4, filed on Jul. 12, 2013, both of which are hereby incorporated by reference in their entireties.

TECHNICAL FIELD

The present invention relates to the field of mobile communications, and in particular, to a terminal device and a locking or unlocking method for the terminal device.

BACKGROUND

Currently, in order to prevent a panel of a terminal device from being mistakenly triggered when the terminal device is not used, many terminal devices such as mobile phones and tablet computers that use a capacitive touch panel or a resistive touch panel have a touch panel locking function and a touch panel unlocking function. For example, there are three or four virtual keys at a lower part of a touch panel of most mobile phones using an Android operating system, which, for example, are a menu key (menu), a home key (home), a back key (back), and a search key (search). In order to prevent a mobile phone from being mistakenly operated when the mobile phone is idle, a panel of the mobile phone may enter a locked state after the mobile phone keeps static for a period of time or a user actively presses a power (power) key or a panel locking key. In a panel locked state, an LCD (Liquid Crystal Display) is turned off, the mobile phone enters a sleep state, and neither a virtual key nor an AA (Active Area) that is on a touch panel (TP) responds to a touch operation. In this case, the virtual key and the touch panel are simultaneously locked. When the locked mobile phone needs to be unlocked, the power key or the panel locking key is pressed again, so that the LCD can be turned on, both a kernel program and the touch panel of the mobile phone are waken up, the virtual key and the touch panel are simultaneously unlocked, and both the virtual key and the AA area that is on the touch panel can respond to a touch operation, which completes unlocking of the virtual key and the touch panel of the mobile phone.

As a panel of a mobile phone becomes increasingly larger, and a frame becomes increasingly narrower, when a touch panel is used, it is more likely to mistakenly press a virtual key. In an existing locking or unlocking solution, when a virtual key and a touch panel are in an unlocked state, if a user presses the virtual key, a currently processed application is terminated, for example, when a game such as Fruit Ninja is played, and a finger needs to perform a slide operation on a full panel, a home key or a back key is often mistakenly pressed to terminate the game, which affects user experience.

SUMMARY

In view of this, a technical problem to be solved in the present invention is: when a touch panel of a terminal device is in an unlocked state, how to prevent a virtual key from being mistakenly operated to interrupt an application that is being processed.

In order to achieve the foregoing objective, according to a first aspect, the present invention provides a locking or unlocking method, where the method is used for locking or unlocking a virtual key area of a terminal device when a touch panel of the terminal device is in an unlocked state, and the method includes:

receiving multiple reported virtual key press events; and determining that the received virtual key press events meet a preset locking or unlocking condition, and setting a state of the virtual key area of the terminal device to a locked state or the unlocked state.

With reference to the first aspect, in a first possible implementation manner, the preset locking or unlocking condition includes a preset time length and a preset order, and the determining that the received virtual key press events meet a preset locking or unlocking condition, and setting a state of the virtual key area of the terminal device to a locked state or the unlocked state includes:

determining that within the preset time length, an order of reporting the multiple virtual key press events received from the first time to the last time meets the preset order, and setting the state of the virtual key area of the terminal device to the locked state or the unlocked state.

With reference to the first possible implementation manner of the first aspect, in a second possible implementation manner, before the determining that the received virtual key press events meet a preset locking or unlocking condition, the method includes:

determining that a reported up event is received.

With reference to the first aspect and either one of the possible implementation manners of the first aspect, in a third possible implementation manner, the preset locking or unlocking condition further includes the preset time length and a preset number of key press times, and the determining that the received virtual key press events meet a preset locking or unlocking condition, and setting a state of the virtual key area of the terminal device to a locked state or the unlocked state further includes:

determining that within the preset time length, the number of times of reporting the multiple received virtual key press events meets the preset number of key press times, and setting the state of the virtual key area of the terminal device to the locked state or the unlocked state.

With reference to the third possible implementation manner of the first aspect, in a fourth possible implementation manner, the determining that within the preset time length, the number of times of reporting the multiple received virtual key press events meets the preset number of key press times, and setting the state of the virtual key area of the terminal device to the locked state or the unlocked state includes:

when the number of times of reporting a received first virtual key press event is a first number of key press times, setting the state of the virtual key area of the terminal device to the locked state or the unlocked state; or when the number of times of reporting a received first virtual key press event is a first number of key press times, setting the state of the virtual key area of the terminal device to the locked state or the unlocked state, and when the number of times of reporting the received first virtual key press event is a second number of key press times, setting the state of the virtual key area of the terminal device to the unlocked state or the locked state; or when the number of times of reporting a received first virtual key press event is a first number of key press times, setting the state of the virtual key area of the terminal device to the locked state or the unlocked state, and when the number of times of reporting a received second virtual key press event is the first number of key press times, setting the state of the virtual key area of the terminal device to the unlocked state or the locked state; or when the number of times of reporting a received first virtual key press event is a first number of key press times, setting the state of the virtual key area of the terminal device to the locked state or the unlocked state, and when the number of times of reporting a received second virtual key press event is a second number of key press times, setting the state of the virtual key area of the terminal device to the unlocked state or the locked state.

According to a second aspect, the present invention provides a terminal device, including:

a receiving unit, configured to receive multiple reported virtual key press events when a touch panel of the terminal device is in an unlocked state; and a processing unit, configured to determine that the received virtual key press events meet a preset locking or unlocking condition, and set a state of a virtual key area of the terminal device to a locked state or the unlocked state.

With reference to the second aspect, in a first possible implementation manner, the preset locking or unlocking condition includes a preset time length and a preset order, and the processing unit is further configured to determine that within the preset time length, an order of reporting the multiple virtual key press events received from the first time to the last time meets the preset order, and set the state of the virtual key area of the terminal device to the locked state or the unlocked state.

With reference to the first possible implementation manner of the second aspect, in a second possible implementation manner, the processing unit is further configured to: before determining that the received virtual key press events meet the preset locking or unlocking condition, determine that a reported up event is received.

With reference to the second aspect and either one of the possible implementation manners of the second aspect, in a third possible implementation manner, the preset locking or unlocking condition further includes the preset time length and a preset number of key press times, and the processing unit is further configured to: determine that within the preset time length, the number of times of reporting the multiple received virtual key press events meets the preset number of key press times, and set the state of the virtual key area of the terminal device to the locked state or the unlocked state.

With reference to the third possible implementation manner of the second aspect, in a fourth possible implementation manner, the processing unit is further configured to:

when the number of times of reporting a received first virtual key press event is a first number of key press times, set the state of the virtual key area of the terminal device to the locked state or the unlocked state; or when the number of times of reporting a received first virtual key press event is a first number of key press times, set the state of the virtual key area of the terminal device to the locked state or the unlocked state, and when the number of times of reporting the received first virtual key press event is a second number of key press times, set the state of the virtual key area of the terminal device to the unlocked state or the locked state; or when the number of times of reporting a received first virtual key press event is a first number of key press times, set the state of the virtual key area of the terminal device to the locked state or the unlocked state, and when the number of times of reporting a received second virtual key press event is the first number of key press times, set the state of the virtual key area of the terminal device to the unlocked state or the locked state; or when the number of times of reporting a received first virtual key press event is a first number of key press times, set the state of the virtual key area of the terminal device to the locked state or the unlocked state, and when the number of times of reporting a received second virtual key press event is a second number of key press times, set the state of the virtual key area of the terminal device to the unlocked state or the locked state.

According to the embodiments of the present invention, when a touch panel of a terminal device is in an unlocked state, if multiple virtual key press events received by a system of the terminal device meet a locking or unlocking condition, a state of a virtual key area of the terminal device may be set to a locked state or the unlocked state; therefore, the virtual key area of the terminal device can be independently locked/unlocked. When a user mistakenly operates a virtual key when using the touch panel, and the virtual key area is in the locked state, an application that is being processed is not interrupted, which improves user experience.

BRIEF DESCRIPTION OF THE DRAWINGS

The accompanying drawings of the specification that are included in the specification and form a part of the specification and the specification together show exemplary embodiments, features, and aspects of the present invention, and are used for explaining the principle of the present invention.

DETAILED DESCRIPTION OF ILLUSTRATIVE EMBODIMENTS

Figure 1A:
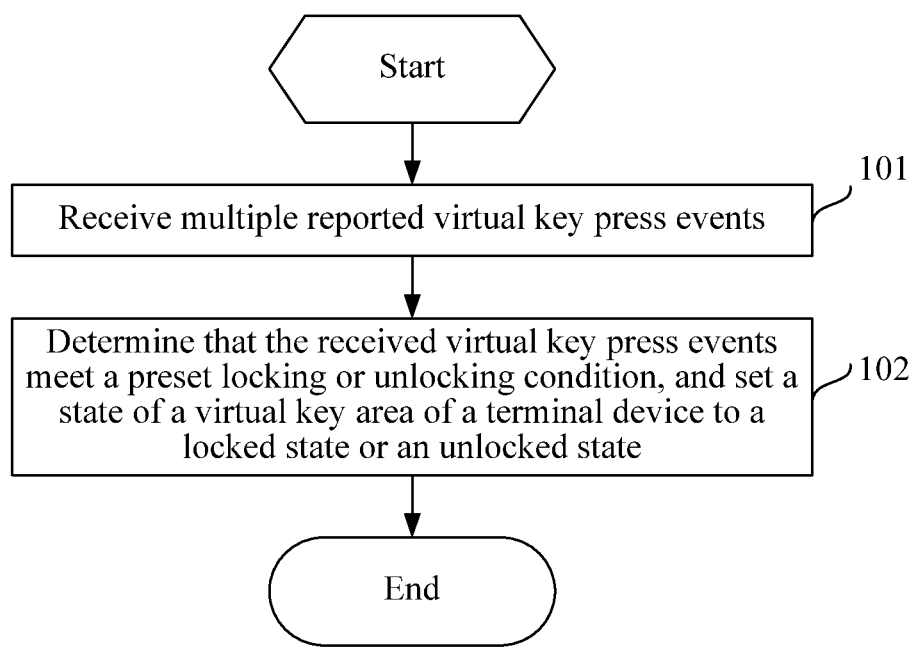
FIG. 1a is a flowchart of a locking or unlocking method according to Embodiment 1 of the present invention.

The following describes various exemplary embodiments, features, and aspects of the present invention in detail with reference to the accompanying drawings. A same reference numeral in the accompanying drawings indicates components having a same or similar function. Though various aspects of the embodiments are shown in the accompanying drawings, unless otherwise specified, the accompanying drawings do not need to be drawn proportionally.

The specific term "exemplary" herein means "used as an example or embodiment or illustrative." Any embodiment described as "exemplary" is not necessarily explained as being superior or better than other embodiments.

In addition, for better description of the present invention, a lot of specific details are provided in the following specific implementation manners. A person of ordinary skill in the art should understand that the present invention may also be implemented without the specific details. In some other embodiments, methods, means, components, and circuits known to people are not described in detail for the convenience of highlighting the main idea of the present invention.

Embodiment 1

FIG. 1a is a flowchart of a locking or unlocking method according to Embodiment 1 of the present invention. As shown in FIG. 1a, the locking or unlocking method is used for locking or unlocking a virtual key area of a terminal device when a touch panel of the terminal device is in an unlocked state, and may specifically include the following steps:

Step 101: Receive multiple reported virtual key press events.

Figure 1B:
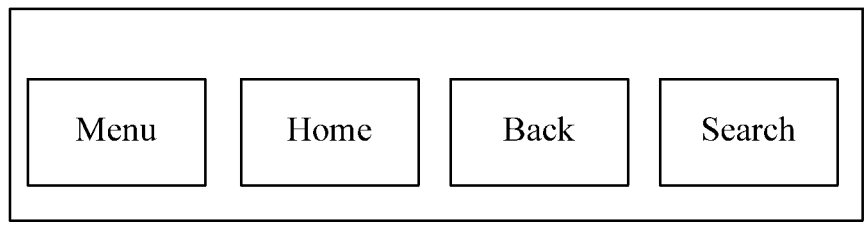
FIG. 1b is a schematic diagram of virtual keys in the locking or unlocking method according to Embodiment 1 of the present invention.

A virtual key in the terminal device such as a mobile phone or a tablet computer is generally separated from the touch panel, and may be located at a lower part or another location of the touch panel. The number of virtual keys of different types of terminal devices may be different, and may be one or multiple. FIG. 1b is a schematic diagram of virtual keys in the locking or unlocking method according to Embodiment 1 of the present invention. The virtual keys may include, for example, a menu key (menu), a home key (home), a back key (back), or a search key (search). In this embodiment of the present invention, when a user taps a virtual key of the terminal device, in response to a tapping operation of the user, a driver of the touch panel reports a virtual key press event corresponding to the virtual key to a system of the terminal device.

Step 102: Determine that the received virtual key press events meet a preset locking or unlocking condition, and set a state of the virtual key area of the terminal device to a locked state or the unlocked state.

The system of the terminal device may acquire a virtual key press event according to a virtual key acquiring function. For example, in an Android system, a getevent function in an Eventhub.cpp program in the system of the terminal device may be modified, and a global virtual key lock flag may be added to the getevent function. In the getevent function, the virtual key press event reported by the driver of the touch panel in response to the tapping operation of the user may be acquired, and the virtual key press event includes a time parameter. When the system receives a reported virtual key press event, it may be further determined whether the virtual key press event meets a locking or unlocking condition.

After the terminal device such as a mobile phone or a tablet computer is started up, the lock flag in the getevent function may be set to the unlocked state. In this case, the touch panel and the virtual key of the terminal device are simultaneously in an unlocked state. In this case, when the terminal device is processing an application, in order to prevent the virtual key from being mistakenly pressed to terminate the application in advance in a process in which the application is being processed, the user can independently lock or unlock the virtual key area of the terminal device.

Using a locking process as an example, it is assumed that a preset locking condition is: sliding from a first virtual key to a last virtual key of the terminal device. If the system of the terminal device acquires, from the getevent function, a first reported virtual key press event, it starts to determine whether several other virtual key press events of the terminal device are sequentially reported within a preset time length, and an up event is reported after a last virtual key press event is reported. If these conditions are all met, the lock flag is set to the locked state, and after locking, if a virtual key press event occurs subsequently, the virtual key press event may be not reported to the system any longer. In this case, the touch panel of the terminal device is still in the unlocked state in which a response can be made, and the user can still operate an application such as a game. Even though a virtual key is mistakenly pressed in an operation process, the application is not terminated in advance.

Similarly, in an unlocking process, if an order of a preset locking condition is a reversed order of an unlocking condition, when the system detects a last reported virtual key press event in the getevent function, it starts to determine whether several other virtual key press events of the terminal device are reported in a reversed order within a preset time length, and an up event is reported after a first virtual key press event is reported. If these conditions are all met, the lock flag may be set to the unlocked state, and a virtual key press event is re-reported to the system.

According to the locking or unlocking method in this embodiment, when a touch panel of a terminal device is in an unlocked state, if multiple virtual key press events received by a system of the terminal device meet a locking or unlocking condition, a state of a virtual key area of the terminal device may be set to a locked state or the unlocked state; therefore, the virtual key area of the terminal device can be independently locked/unlocked. When a user mistakenly operates a virtual key when using the touch panel, and the virtual key area is in the locked state, an application that is being processed is not interrupted, which improves user experience.

Embodiment 2

Figure 2:
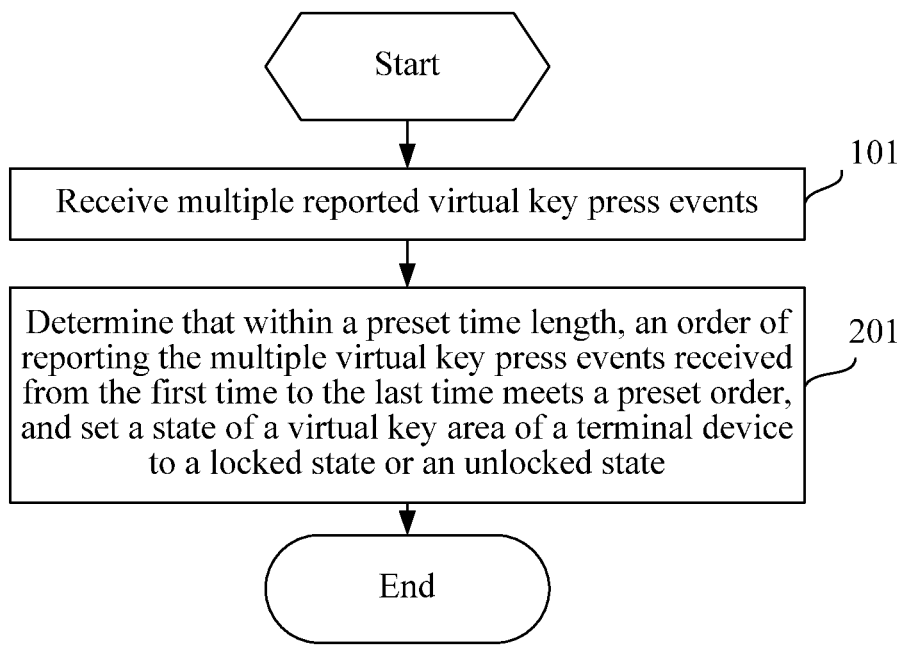
FIG. 2 is a flowchart of a locking or unlocking method according to Embodiment 2 of the present invention.

FIG. 2 is a flowchart of a locking or unlocking method according to Embodiment 2 of the present invention. Steps in FIG. 2 that have same numerals with steps in FIG. 1a have same meanings. As shown in FIG. 2, a main difference from the foregoing embodiment lies in that: the preset locking or unlocking condition includes a preset time length and a preset order, and step 102 of determining that the received virtual key press events meet the preset locking or unlocking condition, and setting the state of the virtual key area of the terminal device to the locked state or the unlocked state may specifically include:

Step 201: Determine that within a preset time length, an order of reporting the multiple virtual key press events received from the first time to the last time meets the preset order, and set the state of the virtual key area of the terminal device to the locked state or the unlocked state.

Specifically, a system of the terminal device may preset a time length and an order that are used for determining. When the system of the terminal device receives a virtual key press event that is reported in response to an operation of a user, the virtual key press event may carry a time parameter, where the time parameter is used for indicating a moment when the virtual key press event occurs. The system may determine whether a time interval between a time when a first received virtual key press event is reported and a time when a last received virtual key press event is reported is within the preset time length; in addition, the system may further determine whether the series of received virtual key press events are reported according to the order preset by the system; and if the series of the received virtual key press events are reported according to the order preset by the system, it indicates that the operation of the user meets the preset order in the preset locking or unlocking condition. In a case in which both the preset time length and the preset order are met, the state of the virtual key area may be set to the locked state or the unlocked state. If one of the conditions is not met, a locking or unlocking process may be ended, and these virtual key press events are processed according to a normal process of the system.

For example, the terminal device such as a mobile phone may have four virtual keys successively from left to right, which are a menu key, a home key, a back key, and a search key. Using a locking process as an example, when both a touch panel and the virtual key area are in an unlocked state, it is assumed that the preset time length is 100 ms (microseconds), and the preset order is: the menu key, the home key, the back key, and the search key. Within 100 ms, the user keeps sliding from the menu key to the search key by successively passing the home key and the back key, and virtual key press events sequentially received by the system are: an event of tapping the menu key, an event of tapping the home key, an event of tapping the back key, and an event of tapping the search key. In this case, it may be determined that a locking condition is met, and the state of the virtual key area may be set to the locked state. A preset order in an unlocking condition may be the same as that in the locking condition, for example, when the virtual key area is in the locked state, within 100 ms, the virtual key press events sequentially received by the system are: the event of tapping the menu key, the event of tapping the home key, the event of tapping the back key, and the event of tapping the search key, and the state of the virtual key area may be set to the unlocked state. In addition, the preset order in the unlocking condition may be different from that in the locking condition, for example, the preset order in the unlocking condition may be a reversed order of that in the locking condition.

Further, the number of virtual keys involved in the locking condition may be the same as that involved in the unlocking condition, for example, in the foregoing example, the four virtual key press events needs to be received according to the preset orders in both the locking condition and the unlocking condition. The number of virtual keys involved in the locking condition may be different from that involved in the unlocking condition, for example, the locking condition uses the four virtual key press events in the foregoing example, and the unlocking condition uses only two virtual key press events that are generated by sliding from the search key to the back key.

Further, the preset time length in the locking condition and the preset time length in the unlocking condition may be the same or may be different, for example, both the preset time lengths are 100 ms, or the preset time length in the locking condition is 100 ms and the preset time length in the unlocking condition is 200 ms.

An order of determining a time length and a reporting order may be changed, for example, the reporting order may be determined first, and then the time length is determined, or the time length and the reporting order are simultaneously determined.

According to the locking or unlocking method in this embodiment, when a touch panel of a terminal device is in an unlocked state, if multiple virtual key press events received by a system of the terminal device meet a locking or unlocking condition, a state of a virtual key area of the terminal device may be set to a locked state or the unlocked state; therefore, the virtual key area of the terminal device can be independently locked/unlocked. When a user mistakenly operates a virtual key when using the touch panel, and the virtual key area is in the locked state, an application that is being processed is not interrupted, which improves user experience.

Embodiment 3

Figure 3A:
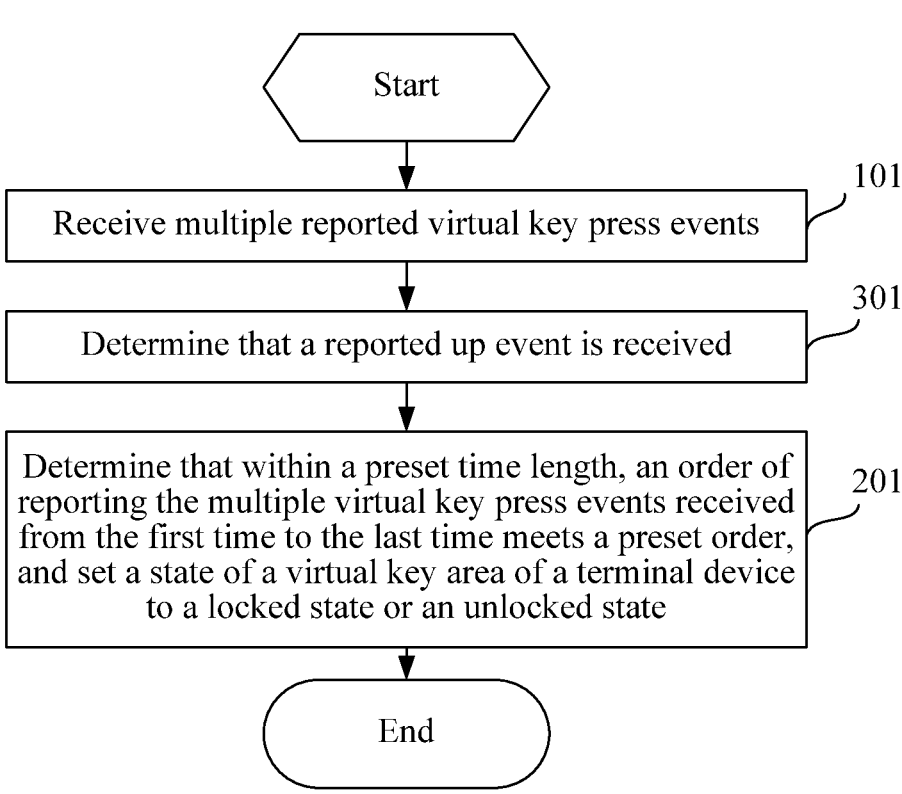
FIG. 3a is a flowchart of a locking or unlocking method according to Embodiment 3 of the present invention.

FIG. 3a is a flowchart of a locking or unlocking method according to Embodiment 3 of the present invention. Steps in FIG. 3a that have same numerals with steps in FIG. 1a and FIG. 2 have same meanings. As shown in FIG. 3a, a main difference from the foregoing embodiments lies in that: before it is determined that the received virtual key press events meet the preset locking or unlocking condition, the locking or unlocking method includes:

Step 301: Determine that a reported up event is received.

The up event may be determined by strength and coordinates. For example, when a finger taps and then lifts up, strength exerted on a virtual key area may change; in this case, a system may receive a reported up event. When the finger slides out of the virtual key area, a tapping range is beyond a coordinate range of the virtual key area; in this case, the system may also receive a reported up event. The system may use the up event as a triggering condition of determining.

Figure 3B:
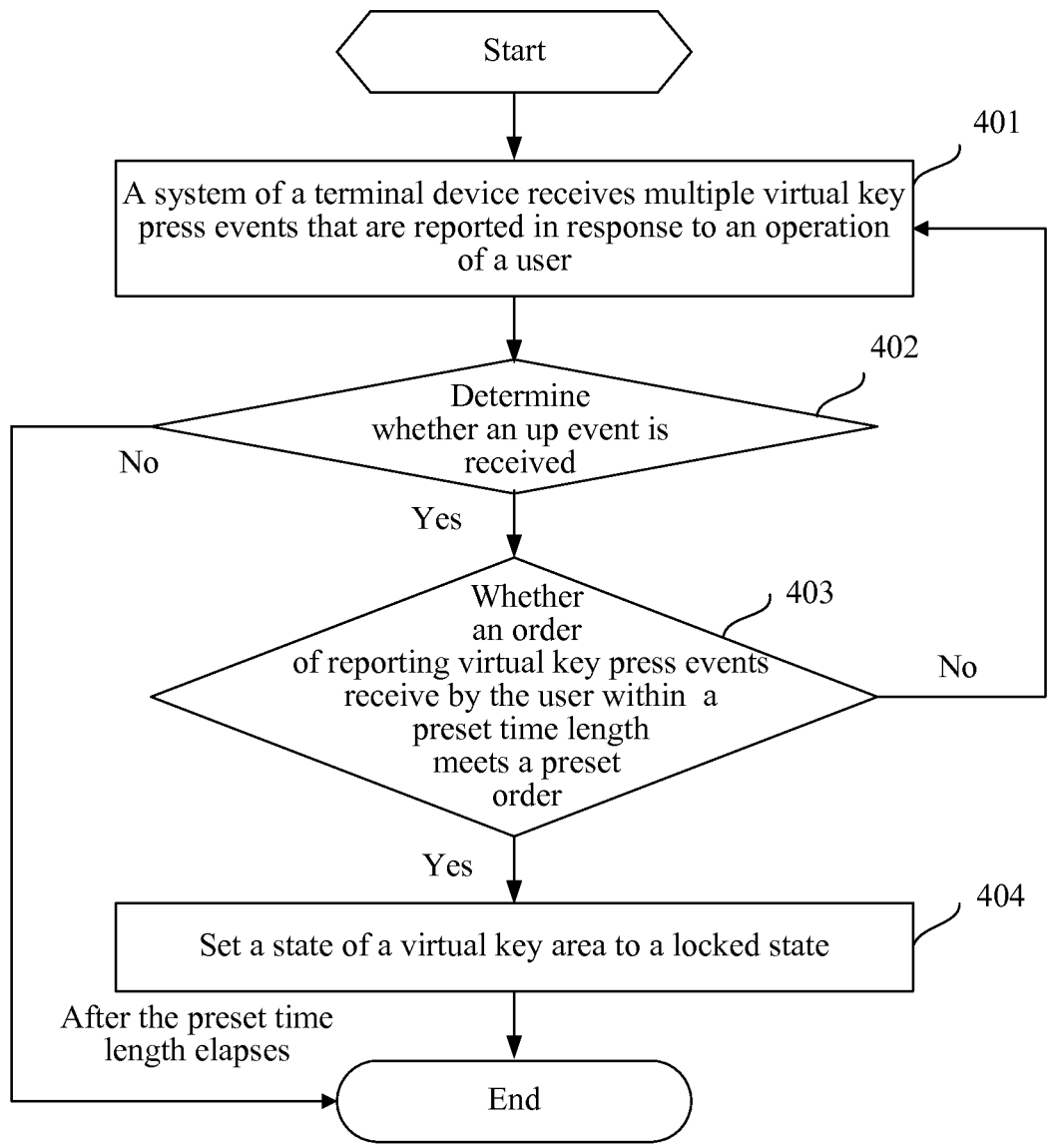
FIG. 3b is a schematic diagram of an application scenario of a locking method according to Embodiment 3 of the present invention.

FIG. 3b is a schematic diagram of an application scenario of a locking method according to Embodiment 3 of the present invention. As shown in FIG. 3b, a specific process may include the following steps:

Step 401: A system of a terminal device receives multiple virtual key press events that are reported in response to an operation of a user, for example, if the user taps a menu key in a virtual key area, a reported event of tapping the menu key may be received.

Step 402: Determine whether an up event is received; and if yes, perform step 403; otherwise, go back to step 401, and wait until other virtual key press events are received and then continue processing; or if the reported up event is not received after a preset time length elapses, this locking process may be ended, and processing is performed according to a normal working process.

Step 403: Determine whether an order of reporting virtual key press events received by the user within the preset time length meets a preset order; and if yes, perform step 404; otherwise, end the locking process, perform processing according to a normal working process, and continue to perform step 401.

Figure 3C:
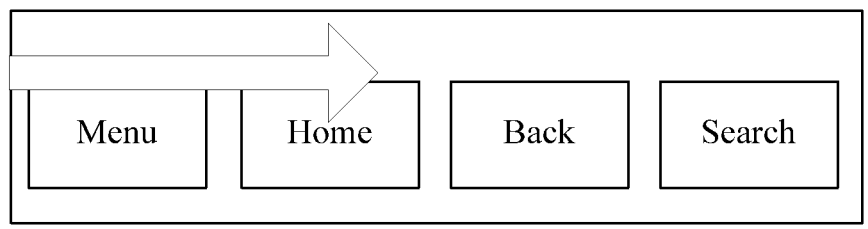
FIG. 3c is a schematic diagram of an application scenario of the locking or unlocking method according to Embodiment 3 of the present invention.

FIG. 3c is a schematic diagram of an application scenario of the locking or unlocking method according to Embodiment 3 of the present invention. For example, the terminal device such as a mobile phone may have four virtual keys successively from left to right, which are a menu key (menu), a home key (home), a back key (back), and a search key (search). Using the locking process as an example, it is assumed that a preset order in a locking condition is: the menu key, the home key, the back key, and the search key. After the up event is received, it starts to determine whether an order of four virtual key press events received within 100 ms before the up event is received is: an event of tapping the menu key, an event of tapping the home key, an event of tapping the back key, and an event of tapping the search key; and if yes, the state of the virtual key area may be set to a locked state. For another example, the preset time length of the terminal device is 100 ms; however, within 100 ms, the up event is not received all the time, it may be determined that a locking or unlocking condition is not met, and this locking or unlocking process is ended. For another example, after the user performs a tapping operation on the menu key, the finger moves up directly, and the system may receive a reported event of tapping the menu key and the up event; however, that only the event of tapping the menu key is received does not meet the order in the locking condition, the locking process may be ended, and processing is performed according to a normal working process of the event of tapping the menu key. An unlocking process is similar to the locking process, and a preset order and a preset time length in an unlocking condition may be the same as those in the locking condition or may be different from those in the locking condition.

Step 404: Set the state of the virtual key area to the locked state, for example, set a virtual key lock flag in a getevent function to a locked state.

According to the locking or unlocking method in this embodiment, when a touch panel of a terminal device is in an unlocked state, if multiple virtual key press events received by a system of the terminal device meet a locking or unlocking condition, a state of a virtual key area of the terminal device may be set to a locked state or the unlocked state; therefore, the virtual key area of the terminal device can be independently locked/unlocked. When a user mistakenly operates a virtual key when using the touch panel, and the virtual key area is in the locked state, an application that is being processed is not interrupted, which improves user experience.

Embodiment 4

Figure 4:
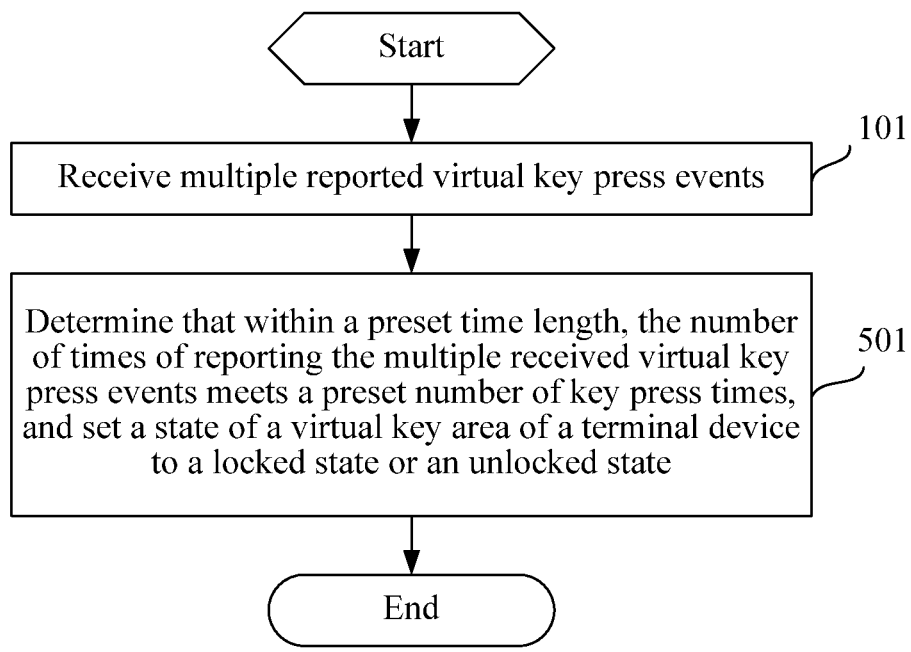
FIG. 4 is a flowchart of a locking or unlocking method according to Embodiment 4 of the present invention.

FIG. 4 is a flowchart of a locking or unlocking method according to Embodiment 4 of the present invention. Steps in FIG. 4 that have same numerals with steps in FIG. 1*a*, FIG. 2, and FIG. 3*a* have same meanings. As shown in FIG. 4, a main difference from the locking or unlocking methods in the foregoing embodiments lies in that: the preset locking or unlocking condition may include a preset time length and a preset number of key press times, and step 102 of determining that the received virtual key press events meet the preset locking or unlocking condition, and setting the state of the virtual key area of the terminal device to the locked state or the unlocked state may further include:

Step 501: Determine that within the preset time length, the number of times of reporting the multiple received virtual key press events meets the preset number of key press times, and set the state of the virtual key area of the terminal device to the locked state or the unlocked state.

Specifically, a virtual key may be locked/unlocked in response to the number of tapping operations performed on the virtual key by a user, which may include any one of the following cases.

Case 1: When the number of times of reporting a received first virtual key press event is a first number of key press times, the state of the virtual key area of the terminal device is set to the locked state or the unlocked state.

For example, when the virtual key area is in the unlocked state, the state of the virtual key area may be set to the locked state by tapping a menu key three successive times, and when the virtual key area needs to be unlocked, the state of the virtual key area may be set to the unlocked state by tapping the menu key three successive times.

Case 2: When the number of times of reporting a received first virtual key press event is a first number of key press times, the state of the virtual key area of the terminal device is set to the locked state or the unlocked state, and when the number of times of reporting the received first virtual key press event is a second number of key press times, the state of the virtual key area of the terminal device is set to the unlocked state or the locked state.

For example, when the virtual key area is in the unlocked state, the state of the virtual key area may be set to the locked state by tapping a menu key three successive times, and when the virtual key area needs to be unlocked, the state of the virtual key area may be set to the unlocked state by tapping the menu key two successive times.

It may be understood that, locking corresponds to unlocking. That is, when the number of times of reporting the received first virtual key press event is the first number of key press times, the state of the virtual key area of the terminal device is set to the locked state, and when the number of times of reporting the received first virtual key press event is the second number of key press times, the state of the virtual key area of the terminal device is set to the unlocked state. Alternatively, when the number of times of reporting the received first virtual key press event is the first number of key press times, the state of the virtual key area of the terminal device is set to the unlocked state, and when the number of times of reporting the received first virtual key press event is the second number of key press times, the state of the virtual key area of the terminal device is set to the locked state. The following case 3 or 4 is also similar.

Case 3: When the number of times of reporting a received first virtual key press event is a first number of key press times, the state of the virtual key area of the terminal device is set to the locked state or the unlocked state, and when the number of times of reporting a received second virtual key press event is the first number of key press times, the state of the virtual key area of the terminal device is set to the unlocked state or the locked state.

For example, when the virtual key area is in the unlocked state, the state of the virtual key area may be set to the locked state by tapping a menu key three successive times, and when the virtual key area needs to be unlocked, the state of the virtual key area may be set to the unlocked state by tapping a search key three successive times.

Case 4: When the number of times of reporting a received first virtual key press event is a first number of key press times, the state of the virtual key area of the terminal device is set to the locked state or the unlocked state, and when the number of times of reporting a received second virtual key press event is a second number of key press times, the state of the virtual key area of the terminal device is set to the unlocked state or the locked state.

For example, when the virtual key area is in the unlocked state, the state of the virtual key area may be set to the locked state by tapping a menu key three successive times, and when the virtual key area needs to be unlocked, the state of the virtual key area may be set to the unlocked state by tapping a search key two successive times.

In the foregoing case 1 to case 4, the first number of key press times and the second number of key press times are preferably at least two, and may be applied to a terminal device with multiple virtual keys. The case 1 and the case 2 may be further specifically applied to a terminal device with only one virtual key, such as an iPhone.

Further, the number of key press times in this embodiment may be used in combination with other locking or unlocking conditions in the foregoing embodiments. For example, a preset order, a preset time length, and a preset number of key press times are simultaneously met; or a preset order, a preset time length, receiving an up event, and a preset number of key press times are simultaneously met.

According to the locking or unlocking method in this embodiment, when a touch panel of a terminal device is in an unlocked state, if multiple virtual key press events received by a system of the terminal device meet a locking or unlocking condition, a state of a virtual key area of the terminal device may be set to a locked state or the unlocked state; therefore, the virtual key area of the terminal device can be independently locked/unlocked. When a user mistakenly operates a virtual key when using the touch panel, and the virtual key area is in the locked state, an application that is being processed is not interrupted, which improves user experience.

Embodiment 5

Figure 5:
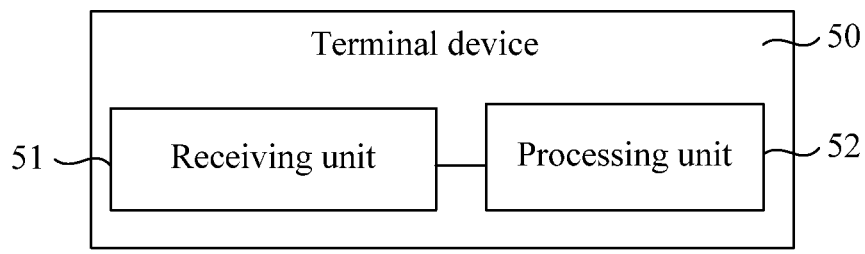
FIG. 5 is a structural block diagram of a terminal device according to Embodiment 5 of the present invention.

FIG. 5 is a structural block diagram of a terminal device according to Embodiment 5 of the present invention. As shown in FIG. 5, the terminal device 50 includes:

a receiving unit 51, configured to receive multiple reported virtual key press events when a touch panel of the terminal device 50 is in an unlocked state; and a processing unit 52, configured to determine that the received virtual key press events meet a preset locking or unlocking condition, and set a state of a virtual key area of the terminal device 50 to a locked state or the unlocked state.

Specifically, the terminal device 50 in this embodiment may perform any one of the locking or unlocking methods in the foregoing embodiments. The processing unit 52 of the terminal device 50 may acquire a virtual key press event according to a virtual key acquiring function. For example, in an Android system, a getevent function in an Eventhub-.cpp program in a system of the terminal device 50 may be modified, and a global virtual key lock flag may be added to the getevent function. In the getevent function, a virtual key press event reported by a driver of the touch panel in response to a tapping operation of a user may be acquired, and the virtual key press event includes a time parameter. When the system receives a reported virtual key press event, it may be further determined whether the virtual key press event meets a locking or unlocking condition. When the terminal device 50 in this embodiment such as a mobile phone or a tablet computer is started up, both a virtual key and the touch panel may be both in a state in which a response can be made, that is, the unlocked state. In this case, when the terminal device 50 is processing an application, in order to prevent the virtual key from being mistakenly pressed to terminate the application in advance in a process in which the application is being processed, the user can lock the virtual key area of the terminal device 50. In this case, if the user performs an operation on the virtual key according to the preset locking or unlocking condition, the receiving unit 51 may receive the virtual key press event that is reported in response to the tapping operation of the user, and then, when determining that the operation of the user meets all preset locking or unlocking conditions, the processing unit 52 may set the state of the virtual key area to the locked state, a virtual key operation of the user is not responded to any longer, but an operation performed by the user on the touch panel may still be responded to. When the virtual key of the terminal device 50 is in the locked state, an unlocking method is similar to the foregoing locking method, and is not described in detail herein.

According to the terminal device in this embodiment, when a touch panel of the terminal device is in an unlocked state, if multiple virtual key press events received by a receiving unit of the terminal device meet a locking or unlocking condition, a processing unit may set a state of a virtual key area of the terminal device to a locked state or the unlocked state; therefore, the virtual key area of the terminal device can be independently locked/unlocked. When a user mistakenly operates a virtual key when using the touch panel, and the virtual key area is in the locked state, an application that is being processed is not interrupted, which improves user experience.

Embodiment 6

Figure 6:
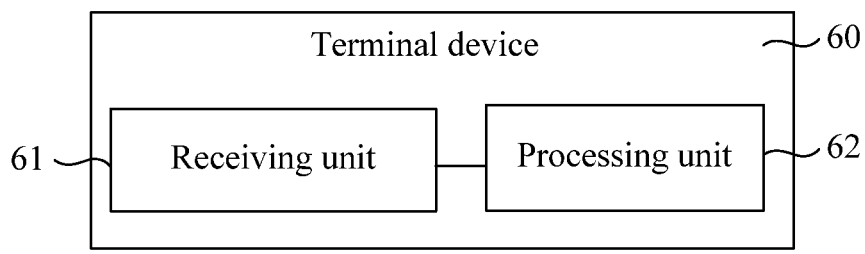
FIG. 6 is a structural block diagram of a terminal device according to Embodiment 6 of the present invention.

FIG. 6 is a structural block diagram of a terminal device according to Embodiment 6 of the present invention. As shown in FIG. 6, the terminal device 60 includes:

a receiving unit 61, configured to receive multiple reported virtual key press events when a touch panel of the terminal device 60 is in an unlocked state; and a processing unit 62, configured to determine that the received virtual key press events meet a preset locking or unlocking condition, and set a state of a virtual key area of the terminal device 60 to a locked state or the unlocked state.

Further, in a possible implementation manner, the preset locking or unlocking condition includes a preset time length and a preset order, and the processing unit 62 is further configured to determine that within the preset time length, an order of reporting the multiple virtual key press events received from the first time to the last time meets the preset order, and set the state of the virtual key area of the terminal device 60 to the locked state or the unlocked state.

Specifically, a system of the terminal device 60 may preset a time length and an order that are used for determining. When the receiving unit 61 receives a virtual key press event that is reported in response to an operation of a user, the virtual key press event may carry a time parameter, where the time parameter is used for indicating a moment when the virtual key press event occurs. The processing unit 62 may determine whether a time interval between a time when a first received virtual key press event is reported and a time when a last received virtual key press event is reported is within the preset time length; in addition, the processing unit 62 determines whether the multiple received virtual key press events are reported according to the order preset by the system; and in a case in which both the preset time length and the preset order are met, the processing unit 62 may set the state of the virtual key area to the locked state or the unlocked state. If one of the conditions is not met, a locking or unlocking process may be ended, and a normal processing process of the terminal device 60 is restored.

Further, in a possible implementation manner, the processing unit 62 is further configured to: before determining that the received virtual key press events meet the preset locking or unlocking condition, determine that a reported up event is received.

Specifically, the up event may be determined by strength and coordinates. For example, when a finger taps and then lifts up, strength exerted on the virtual key area may change; in this case, the receiving unit 61 may receive a reported up event. When the finger slides out of the virtual key area, a tapping range is beyond a coordinate range of the virtual key area; in this case, the receiving unit 61 may also receive a reported up event. The processing unit 62 may use the up event as a triggering condition of determining. For a specific example, reference may be made to a related description in the locking or unlocking method in Embodiment 3.

Further, in a possible implementation manner, the preset locking or unlocking condition further includes the preset time length and a preset number of key press times, and the processing unit 62 is further configured to: determine that within the preset time length, the number of times of reporting the multiple received virtual key press events meets the preset number of key press times, and set the state of the virtual key area of the terminal device 60 to the locked state or the unlocked state.

Specifically, the processing unit 62 is further configured to:

when the number of times of reporting a received first virtual key press event is a first number of key press times, set the state of the virtual key area of the terminal device 60 to the locked state or the unlocked state; or when the number of times of reporting a received first virtual key press event is a first number of key press times, set the state of the virtual key area of the terminal device 60 to the locked state or the unlocked state, and when the number of times of reporting the received first virtual key press event is a second number of key press times, set the state of the virtual key area of the terminal device 60 to the unlocked state or the locked state; or when the number of times of reporting a received first virtual key press event is a first number of key press times, set the state of the virtual key area of the terminal device 60 to the locked state or the unlocked state, and when the number of times of reporting a received second virtual key press event is the first number of key press times, set the state of the virtual key area of the terminal device 60 to the unlocked state or the locked state; or when the number of times of reporting a received first virtual key press event is a first number of key press times, set the state of the virtual key area of the terminal device 60 to the locked state or the unlocked state, and when the number of times of reporting a received second virtual key press event is a second number of key press times, set the state of the virtual key area of the terminal device 60 to the unlocked state or the locked state.

For specific examples of the case 1 to the case 4, reference may be made to a related description in the locking or unlocking method in Embodiment 4.

According to the terminal device in this embodiment, when a touch panel of the terminal device is in an unlocked state, if multiple virtual key press events received by a receiving unit of the terminal device meet a locking or unlocking condition, a processing unit may set state of a virtual key area of the terminal device to a locked state or the unlocked state; therefore, the virtual key area of the terminal device can be independently locked/unlocked. When a user mistakenly operates a virtual key when using the touch panel, and the virtual key area is in the locked state, an application that is being processed is not interrupted, which improves user experience.

Embodiment 7

Figure 7:
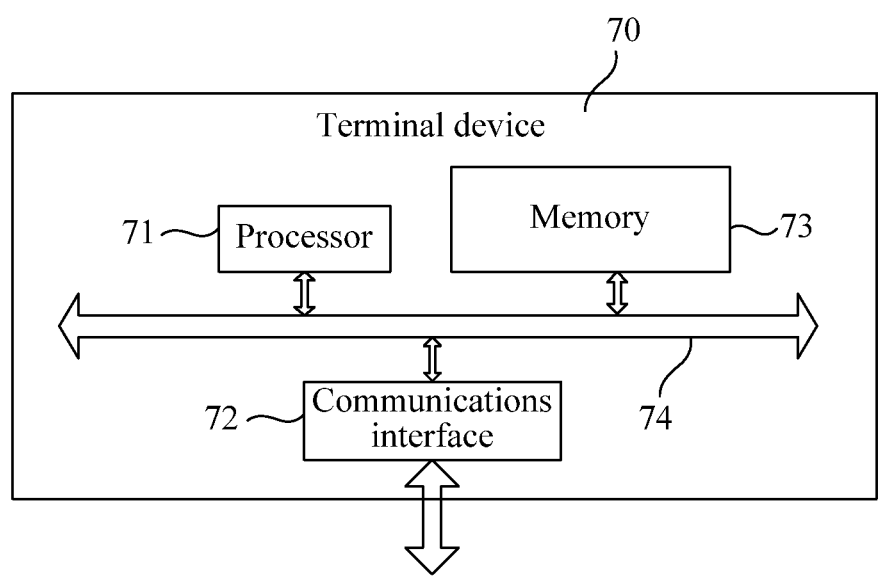
FIG. 7 is a structural block diagram of a terminal device according to Embodiment 7 of the present invention.

FIG. 7 is a structural block diagram of a terminal device according to Embodiment 7 of the present invention. The terminal device 70 may be a host server with a computing capability, a personal computer PC, or a portable computer or terminal. Specific implementation of a computing node is not limited in a specific embodiment of the present invention.

The terminal device 70 includes a processor 71, a communications interface 72, a memory 73, and a bus 74. The processor 71, the communications interface 72, and the memory 73 complete mutual communication through the bus 74.

The communications interface 72 is configured to communicate with a network element, where the network element includes, for example, a virtual machine management center or a shared memory.

The processor 71 is configured to execute a program. The processor 71 may be a central processing unit CPU, or an application specific integrated circuit ASIC (Application Specific Integrated Circuit), or one or more integrated circuits configured to implement the embodiments of the present invention.

The memory 73 is configured to store a file. The memory 73 may include a high-speed RAM memory, or may include a non-volatile memory, such as at least one magnetic disk memory. The memory 73 may also be a memory array. The memory 73 may be further divided into blocks, and the blocks may be combined into a virtual volume according to a rule.

In a possible implementation manner, the foregoing program may be program code including a computer operation instruction. The program may be specifically used to lock/unlock a virtual key area of the terminal device when a touch panel of the terminal device is in an unlocked state, which specifically includes:

receiving multiple reported virtual key press events; and determining that the received virtual key press events meet a preset locking or unlocking condition, and setting a state of the virtual key area of the terminal device to a locked state or the unlocked state.

Further, the preset locking or unlocking condition includes a preset time length and a preset order, and the determining that the received virtual key press events meet a preset locking or unlocking condition, and setting a state of the virtual key area of the terminal device to a locked state or the unlocked state includes:

determining that within the preset time length, an order of reporting the multiple virtual key press events received from the first time to the last time meets the preset order, and setting the state of the virtual key area of the terminal device to the locked state or the unlocked state.

Further, before the determining that the received virtual key press events meet a preset locking or unlocking condition, the method includes:

determining that a reported up event is received.

Further, the preset locking or unlocking condition further includes the preset time length and a preset number of key press times, and the determining that the received virtual key press events meet a preset locking or unlocking condition, and setting a state of the virtual key area of the terminal device to a locked state or the unlocked state further includes:

determining that within the preset time length, the number of times of reporting the multiple received virtual key press events meets the preset number of key press times, and setting the state of the virtual key area of the terminal device to the locked state or the unlocked state.

Further, the determining that within the preset time length, the number of times of reporting the multiple received virtual key press events meets the preset number of key press times, and setting the state of the virtual key area of the terminal device to the locked state or the unlocked state includes:

when the number of times of reporting a received first virtual key press event is a first number of key press times, setting the state of the virtual key area of the terminal device to the locked state or the unlocked state; or when the number of times of reporting a received first virtual key press event is a first number of key press times, setting the state of the virtual key area of the terminal device to the locked state or the unlocked state, and when the number of times of reporting the received first virtual key press event is a second number of key press times, setting the state of the virtual key area of the terminal device to the unlocked state or the locked state; or when the number of times of reporting a received first virtual key press event is a first number of key press times, setting the state of the virtual key area of the terminal device to the locked state or the unlocked state, and when the number of times of reporting a received second virtual key press event is the first number of key press times, setting the state of the virtual key area of the terminal device to the unlocked state or the locked state; or when the number of times of reporting a received first virtual key press event is a first number of key press times, setting the state of the virtual key area of the terminal device to the locked state or the unlocked state, and when the number of times of reporting a received second virtual key press event is a second number of key press times, setting the state of the virtual key area of the terminal device to the unlocked state or the locked state.

A person of ordinary skill in the art may be aware that, exemplary units and algorithm steps in the embodiments described in this specification may be implemented by electronic hardware or a combination of computer software and electronic hardware. Whether the functions are implemented in a form of hardware or software depends on particular applications and design constraint conditions of the technical solutions. A person skilled in the art may select different methods to implement the described functions for a particular application, but it should not be considered that such implementation goes beyond the scope of the present invention.

When the functions are implemented in a form of computer software and sold or used as an independent product, to a certain extent, it may be considered that all or a part of the technical solutions of the present invention (such as a part contributing to the prior art) is implemented in a form of a computer software product. The computer software product is generally stored in a computer readable storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving multiple reported virtual key press events from one or more virtual keys in a virtual key area in a terminal device having a second portion of a touch panel in an unlocked state, wherein a first portion of the touch panel comprises the virtual key area, wherein the second portion of the touch panel is different from the first portion, and wherein the one or more virtual keys in the virtual key area comprise a menu virtual key, a home virtual key, or a back virtual key;
   determining that the received multiple reported virtual key press events meet a preset locking or unlocking condition; and
   setting a state of the one or more virtual keys in the virtual key area to a locked state or an unlocked state according to the determining that the received multiple reported virtual key press events meet the preset locking or unlocking condition, while maintaining the second portion of the touch panel in the unlocked state and while continuing to display the one or more virtual keys in the virtual key area, wherein the one or more virtual keys in the virtual key area respond to virtual key press events when in the unlocked state, and wherein the one or more virtual keys in the virtual key area are displayed and do not respond to virtual key press events when in the locked state so that a user is able to operate contents of the second portion of the touch panel while the virtual keys are in the locked state.

2. The method according to claim 1, wherein the determining that the received multiple reported virtual key press events meet a preset locking or unlocking condition, and the setting the state of the one or more virtual keys in the virtual key area of the terminal device comprise:
   determining that an order of reporting the received multiple reported virtual key press events meets a preset order and that the received multiple reported virtual key press events are received within a preset time length; and
   setting the state of the one or more virtual keys in the virtual key area of the terminal device to the locked state or the unlocked state according to the determining that the order of reporting the received multiple reported virtual key press events meets the preset order and that the received multiple reported virtual key press events are received within the preset time length.

3. The method according to claim 2, further comprising:
   determining, before the determining that the received multiple reported virtual key press events meet a preset locking or unlocking condition, that a reported up event is received.

4. The method according to claim 1, wherein the determining that the received multiple reported virtual key press events meet a preset locking or unlocking condition, and the setting the state of the one or more virtual keys in the virtual key area of the terminal device comprise:
   determining that a count of the received multiple reported virtual key press events meets a preset number of key press events and that the received multiple reported virtual key press events are received within a preset time length; and
   setting the state of the one or more virtual keys in the virtual key area of the terminal device to the locked state or the unlocked state according to the determining that the count of the received multiple reported virtual key press events meets the preset number of key press events and that the received multiple reported virtual key press events are received within the preset time length.

5. The method according to claim 4, wherein the determining that the count of the received multiple reported virtual key press events meets the preset number of key press events and that the received multiple reported virtual key press events are received within the preset time length, and the setting the state of the one or more virtual keys in the virtual key area of the terminal device to the locked state or the unlocked state comprise:

setting the state of the one or more virtual keys in the virtual key area of the terminal device to the locked state or the unlocked state in response to a count of a received first virtual key press event being a first number of key press events.

6. The method according to claim 4, wherein the determining that the count of the received multiple reported virtual key press events meets the preset number of key press events and that the received multiple reported virtual key press events are received within the preset time length, and the setting the state of the one or more virtual keys in the virtual key area of the terminal device to the locked state or the unlocked state comprise:

setting the state of the one or more virtual keys in the virtual key area of the terminal device from the unlocked state to the locked state, or from the locked state to the unlocked state, in response to a count of a received first virtual key press event being a first number of key press events; and setting the state of the one or more virtual keys in the virtual key area of the terminal device from the locked state to the unlocked state, or from the unlocked state to the locked state, in response to the count of the received first virtual key press event being a second number of key press events.

7. The method according to claim 4, wherein the determining that the count of the received multiple reported virtual key press events meets the preset number of key press events and that the received multiple reported virtual key press events are received within the preset time length, and the setting the state of the one or more virtual keys in the virtual key area of the terminal device to the locked state or the unlocked state comprise:

setting the state of the one or more virtual keys in the virtual key area of the terminal device from the unlocked state to the locked state, or from the locked state to the unlocked state, in response to a count of a received first virtual key press event being a first number of key press events; and setting the state of the one or more virtual keys in the virtual key area of the terminal device from the locked state to the unlocked state, or from the unlocked state to the locked state, in response to a count of a received second virtual key press event being the first number of key press events.

8. The method according to claim 4, wherein the determining that, within the preset time length, the count of the received multiple reported virtual key press events meets the preset number of key press events and that the received multiple reported virtual key press events are received within the preset time length, and the setting the state of the one or more virtual keys in the virtual key area of the terminal device to the locked state or the unlocked state comprise:

setting the state of the one or more virtual keys in the virtual key area of the terminal device from the unlocked state to the locked state, or from the locked state to the unlocked state, in response to a count of a received first virtual key press event being a first number of key press events; and setting the state of the one or more virtual keys in the virtual key area of the terminal device from the locked state to the unlocked state, or from the unlocked state to the locked state, in response to a count of a received second virtual key press event being a second number of key press events.

9. A terminal device, comprising:

a touch panel having a first portion and a second portion, the first portion comprising one or more virtual keys in a virtual key area, the second portion being different from the first portion;

a non-transitory computer readable memory having executable instructions stored thereon; and a processor coupled with the memory and to the touch panel, the processor configured to execute the instructions, which, when executed, cause the processor to:

receive multiple reported virtual key press events when the second portion of the touch panel is in an unlocked state;

determine that the received multiple reported virtual key press events meet a preset locking or unlocking condition; and set a state of the one or more virtual keys in the virtual key area to a locked state or an unlocked state, while maintaining the second portion of the touch panel in the unlocked state and while continuing to display the one or more virtual keys in the virtual key area, wherein the one or more virtual keys in the virtual key area respond to virtual key press events when in the unlocked state, and wherein the one or more virtual keys in the virtual key area are displayed and do not respond to virtual key press events when in the locked state so that a user is able to operate contents of the second portion of the touch panel while the virtual keys are in the locked state.

10. The terminal device according to claim 9, wherein the instructions, when executed, further cause the processor to:

determine that an order of reporting the received multiple reported virtual key press events meets a preset order and that the received multiple reported virtual key press events are received within a preset time length; and set the state of the one or more virtual keys in the virtual key area to the locked state or the unlocked state according to the determination that the order of reporting the received multiple reported virtual key press events meets the preset order and that the received multiple reported virtual key press events are received within the preset time length.

11. The terminal device according to claim 10, wherein the instructions, when executed, further cause the processor to:

determine that a reported up event is received.

12. The terminal device according to claim 9, wherein the instructions, when executed, further cause the processor to:

determine that a count of the received multiple reported virtual key press events meets a preset number of key press events and that the received multiple reported virtual key press events are received within a preset time length; and set the state of the one or more virtual keys in the virtual key area to the locked state or the unlocked state according to the determination that the count of the received multiple reported virtual key press events meets the preset number of key press events and that the received multiple reported virtual key press events are received within the preset time length.

13. The terminal device according to claim 12, wherein the instructions, when executed, further cause the processor to:

set the state of the one or more virtual keys in the virtual key area to the locked state or the unlocked state in response to a count of a received first virtual key press event being a first number of key events.

14. The terminal device according to claim 12, wherein the instructions, when executed, further cause the processor to:

set the state of the one or more virtual keys in the virtual key area from the unlocked state to the locked state, or from the locked state to the unlocked state, in response to a count of a received first virtual key press event being a first number of key press events; and set the state of the one or more virtual keys in the virtual key area from the locked state to the unlocked state, or from the unlocked state to the locked state, in response to the count of the received first virtual key press event being a second number of key press events.

15. The terminal device according to claim 12, wherein the instructions, when executed, further cause the processor to:

set the state of the one or more virtual keys in the virtual key area from the unlocked state to the locked state, or from the locked state to the unlocked state, in response to a count of a received first virtual key press event being a first number of key press events; and set the state of the one or more virtual keys in the virtual key area from the locked state to the unlocked state, or from the unlocked state to the locked state, in response in response a count of a received second virtual key press event being the first number of key press events.

16. The terminal device according to claim 12, wherein the instructions, when executed, further cause the processor to:

set the state of the one or more virtual keys in the virtual key area from the unlocked state to the locked state, or from the locked state to the unlocked state, in response to in response a count of a received first virtual key press event being a first number of key press events; and set the state of the one or more virtual keys in the virtual key area from the locked state to the unlocked state, or from the unlocked state to the locked state, in response to a count of a received second virtual key press event being a second number of key press events.

* * * * *